June 16, 1925.
A. A. SCHULZE
LISTER
Filed June 16, 1923    2 Sheets-Sheet 2
1,542,733
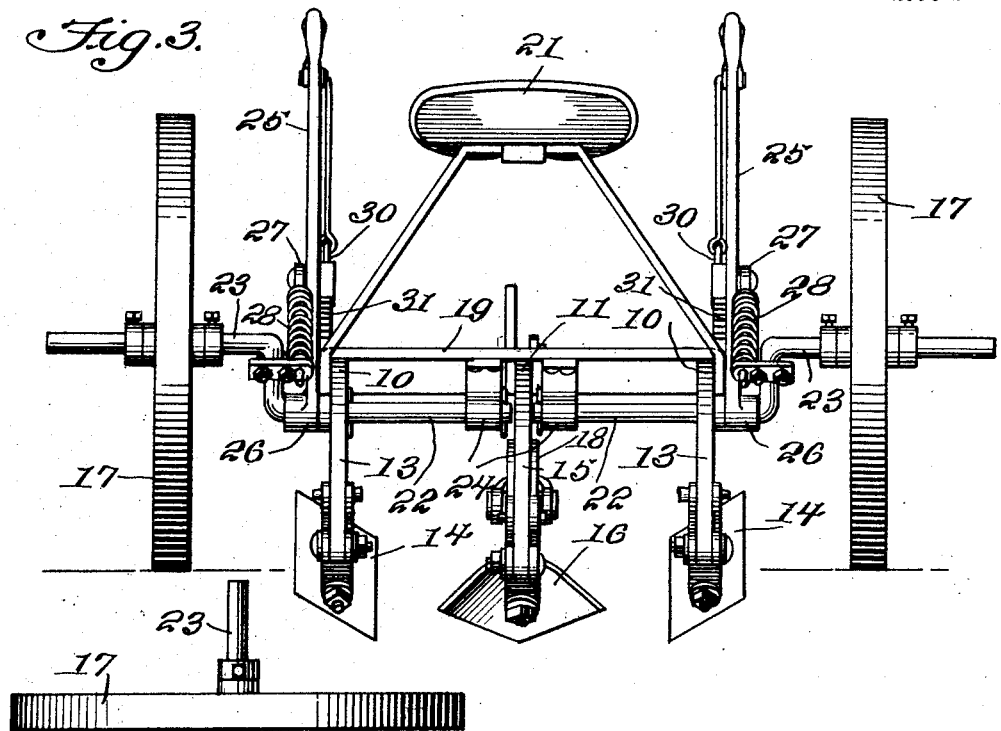
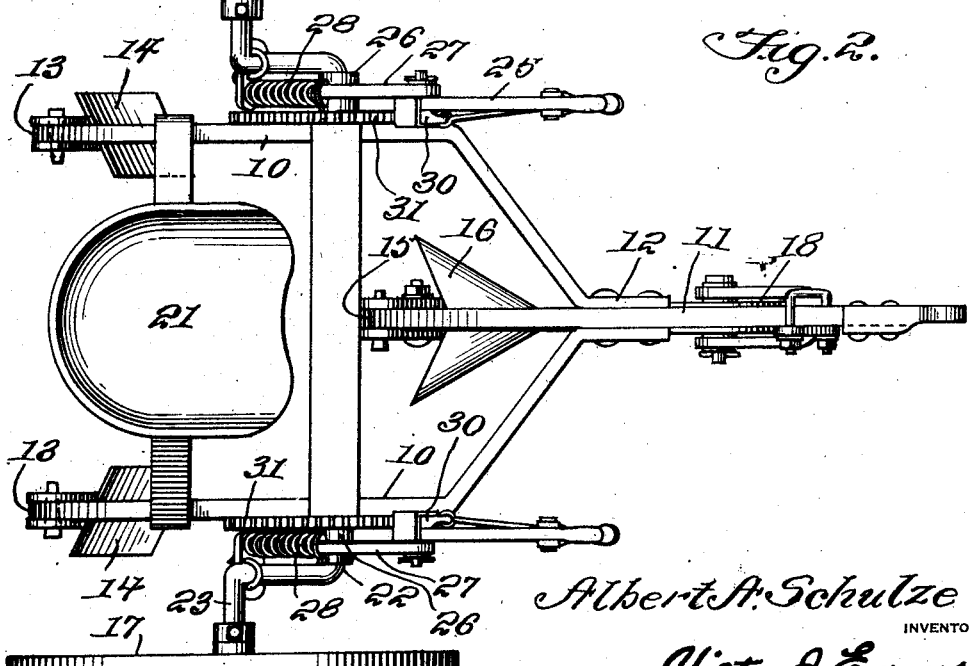
Albert A. Schulze
INVENTOR
BY Victor J. Evans
ATTORNEY
WITNESS:

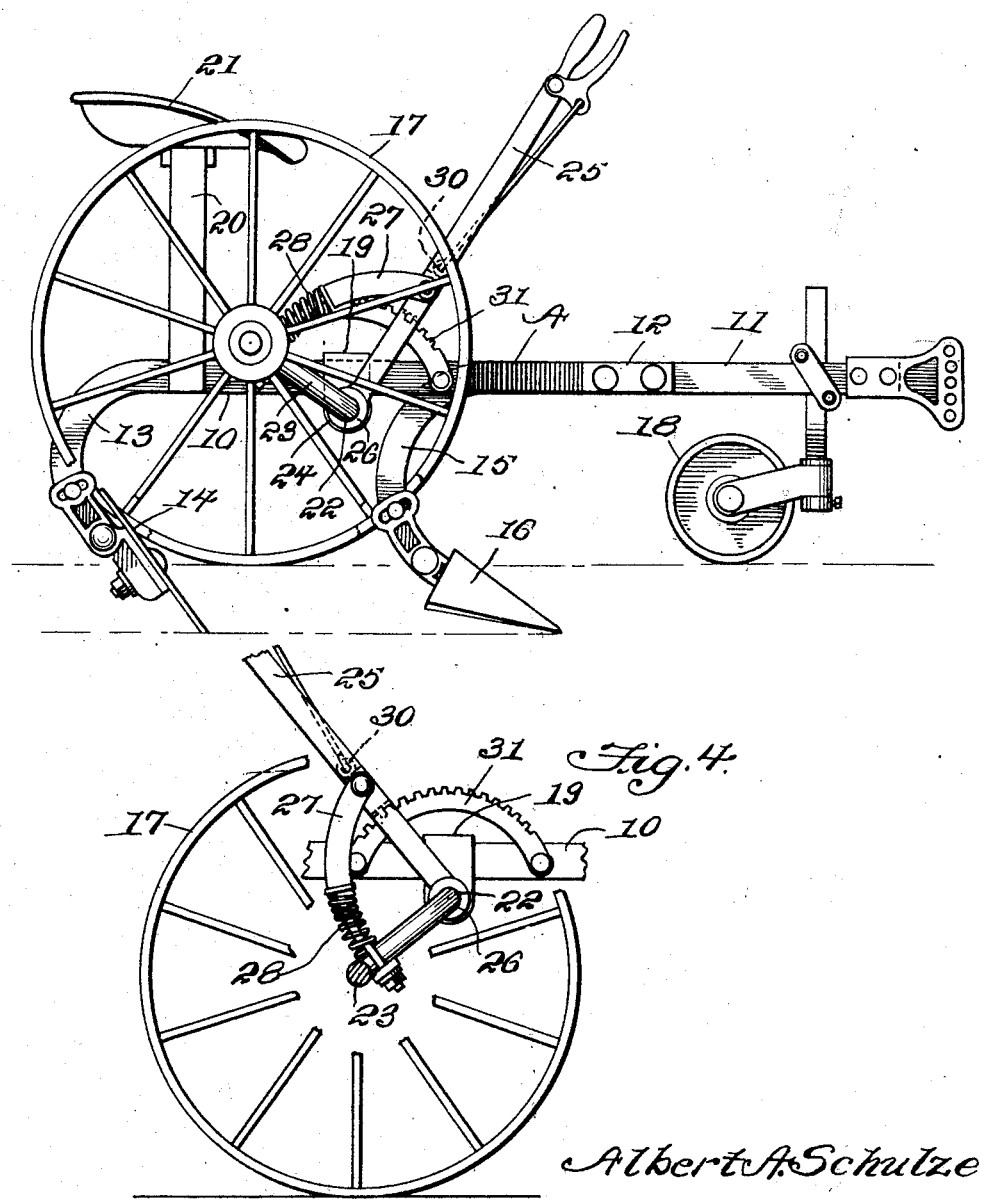

Patented June 16, 1925.

1,542,733

UNITED STATES PATENT OFFICE.

ALBERT A. SCHULZE, OF ZORN, TEXAS.

LISTER.

Application filed June 16, 1923. Serial No. 645,873.

*To all whom it may concern:*

Be it known that I, ALBERT A. SCHULZE, a citizen of the United States, residing at Zorn, in the county of Guadalupe and State of Texas, have invented new and useful Improvements in Listers, of which the following is a specification.

This invention relates to lister plows and contemplates a structure primarily designed for plowing seed beds between rows, or for laying off and marking rows, means being provided for adjusting the plows with relation to the ground in a quick and convenient manner from the driver's seat.

The nature and advantages of the invention will be better understood when the following detailed description is read in connection with the accompanying drawings, the invention residing in the construction, combination and arrangement of parts as claimed.

In the drawings forming part of this application, like numerals of reference indicate similar parts in the several views, and wherein:

Figure 1 is a side elevation.
Figure 2 is a top plan view.
Figure 3 is a rear elevation.
Fig. 4 is a fragmentary view of the raising and lowering means.

Referring to the drawings in detail, A indicates the frame of the lister which is preferably made up of the opposed side beams 10 and a center beam 11 which projects upwardly from the frame, the side beams including convergently disposed portions so that the beams can be suitably connected together as at 12. The side beams 10 have their rear ends curved downwardly as at 13 and each is provided with a plow 14, while the rear end of the beam 11 is similarly curved as at 15 and is equipped with a plow 16. The frame is supported by ground wheels 17 at the rear thereof, and a smaller front wheel 18 in any well known manner. The side beams 10 are further connected together and braced by a cross bar 19. A seat standard is indicated at 20 and supports a seat 21 at the upper end thereof.

The rear wheels 17 are supported upon an arched shaped axle, this axle being made up of two sections as shown, with each wheel mounted on the adjacent section. The arched shaped portion 22 of each axle section 23 is supported by brackets 24 on the underside of the cross bar or base 19, these axles being mounted in these brackets for rocking movement for the purpose of adjusting the frame vertically with relation to the ground. For this purpose I make use of levers 25, there being one lever for each axle section, and the levers are arranged within convenient reach of the operator occupying the seat 21. Each lever is loosely mounted upon the axles as at 26, while it is further connected with the crank portion of the axle by means of a curved arm 27, one end of which is connected with the adjacent lever and the other end of which is connected with the axle by means of a coiled spring 28 utilized as a cushioning element. Manifestly either lever can be actuated to rotate either section of the axle as the occasion may require, and subsequent to the adjustment of the frame in this manner, the lever is held in its given position by means of a pawl 30 cooperating with a curved rack bar 31 mounted on the adjacent beam of the frame. In other words, the construction of the operating mechanism is identical for both sections of the axle which of course is mounted on the opposite side beams of the frame.

While it is believed that from the foregoing description, the nature and advantages of the invention will be readily apparent, I desire to have it understood that I do not limit myself to what is herein shown and described and that such changes may be resorted to when desired as fall within the scope of what is claimed.

Having thus described the invention, I claim:

1. A lister plow comprising a frame, plows carried thereby, a front wheel supporting the frame, rear wheels therefore, a sectional arched shaped axle for said rear wheels, said sections being mounted on the frame for partial rotation, means for rotating said sections of the axle whereby said frame is adjusted with relation to the ground, said means including a lever for each section of the axle, said lever being pivotally mounted on said section, a curved arm connected with said lever, and a resilient connection between the curved arm and the adjacent section of the axle for the purpose specified.

2. The combination with a frame, and a pair of arched axles rotatably supported thereon and provided with ground engaging wheels, perforated plates carried by the arched axles and extending laterally therefrom, a lever fixed to each of the axles, curved arms pivoted to the levers, stems carried thereby and slidably engaging the perforated plates, a stem carried by each of the curved arms, an expansible coil spring engaging the plates and arms, quadrants fixed to the frame and detents carried by the levers and engageable with the quadrants whereby to lock the levers in adjusted position, the movement of the levers serving to rotate the axles and thereby adjust the frame vertically with relation to the ground, and earth working elements carried by the frame.

In testimony whereof I affix my signature.

ALBERT A. SCHULZE.